(12) United States Patent
Yim et al.

(10) Patent No.: US 9,581,416 B1
(45) Date of Patent: Feb. 28, 2017

(54) RAIL MOUNT

(71) Applicants: Hongkyu Yim, Anyang-si, KS (US);
Younyi Jung, Bucheon-si (KR)

(72) Inventors: Hongkyu Yim, Anyang-si, KS (US);
Younyi Jung, Bucheon-si (KR)

(*) Notice: Subject to any disclaimer, the term of this patent is extended or adjusted under 35 U.S.C. 154(b) by 0 days.

(21) Appl. No.: 14/872,192

(22) Filed: Oct. 1, 2015

(30) Foreign Application Priority Data

Aug. 12, 2015 (KR) .................. 10-2015-0113841

(51) Int. Cl.
| | |
|---|---|
| *F41G 1/387* | (2006.01) |
| *F41G 11/00* | (2006.01) |
| *F16M 13/02* | (2006.01) |
| *F16B 2/18* | (2006.01) |
| *F41G 1/28* | (2006.01) |
| *F41G 1/16* | (2006.01) |

(52) U.S. Cl.
CPC ............ *F41G 11/004* (2013.01); *F16B 2/185* (2013.01); *F16M 13/02* (2013.01); *F41G 1/16* (2013.01); *F41G 1/28* (2013.01); *F41G 11/003* (2013.01)

(58) Field of Classification Search
CPC .... F41G 11/024; F41G 11/001; F41G 11/003; F41G 1/16; F41G 1/22; F41G 1/28; F41G 1/38; F16B 2/185; F16M 13/02; A42B 3/042; A42B 3/04; G02B 23/125; G02B 27/0149; G02B 2027/0138; G02B 2027/0156
USPC .............. 248/231.31, 274.1, 220.21, 221.11, 248/222.13, 222.14, 223.31, 223.41, 248/177.1, 178.1, 187.1, 682; 42/124, 42/125, 127

See application file for complete search history.

(56) References Cited

U.S. PATENT DOCUMENTS

| | | | | |
|---|---|---|---|---|
| 7,493,721 | B2* | 2/2009 | Swan ................... | F41G 11/003 42/125 |
| 7,739,824 | B1* | 6/2010 | Swan ................... | F41G 11/003 42/124 |
| 7,823,316 | B2* | 11/2010 | Storch .................. | F41C 27/00 42/127 |
| 8,438,965 | B2* | 5/2013 | Collin .................. | F41G 11/003 89/125 |

FOREIGN PATENT DOCUMENTS

KR    10-2014-0092176    7/2014

OTHER PUBLICATIONS

English Abstract of 10-2014-0092176.

* cited by examiner

*Primary Examiner* — Anita M King
(74) *Attorney, Agent, or Firm* — Antonio Ha & U.S. Patent, LLC

(57) ABSTRACT

The present disclosure generally relates to a rail mount having one side that is releasably attached to a rail of a firearm and the other side that is releasably attached to accessories for the firearm, and more particularly to a rail mount that may be releasably attached to a rail in an easy and firm manner, and may be adjusted to a minute change of a rail.

4 Claims, 5 Drawing Sheets

RAIL MOUNT

This application claims the benefit of Korean Patent Application No. 10-2015-0113841 filed on Aug. 12, 2015, the entire contents of which is incorporated herein by reference for all purposes as if fully set forth herein.

BACKGROUND OF THE INVENTION

Field of the Invention

The present disclosure generally relates to a rail mount having one side that is releasably attached to a rail of a firearm and the other side that is releasably attached to accessories for the firearm, and more particularly to a rail mount that may be releasably attached to a rail in an easy and firm manner, and may be adjusted to a minute deformation of a rail.

Discussion of the Related Art

In the late 20th century, many countries in the world began developing various accessories for firearms by using techniques supported by the development of electronic technologies, IT industries, material engineering, and the like, rather than improving performance of firearms based on development and improvement. The reason for this is that there was widespread recognition that the development of the firearm had already reached its limit, and most of the countries, including the U.S., could not introduce next-generation firearms due to a budget deficit, and even if new firearms had been introduced, the scale of firearms to be introduced would have been limited. In addition, the development of electronic technologies and material engineering has reduced the price and size of guns, as well as has enabled remarkable improvement in reliability and durability. Further, as the importance of night combat has increased, there is a need to supply accessories for firearms not only to snipers or special forces, but also to normal combat forces, so that they may view and take aim at targets at night. For this reason, the development and attachment of accessories has been considered an inexpensive and effective means for improving combat efficiency without need to develop or modify existing weapons.

Examples of the accessories for firearms include a telescopic sight, a unit magnification optical sight, a laser target designator, night vision goggles, an infrared target designator, an infrared illuminator, and the like. The telescopic sight, the unit magnification optical sight, the laser target designator, and the like may improve shooting accuracy, thereby minimizing time required from finding a target to aiming the target. Further, the night vision goggles, the infrared target designator, and the infrared illuminator are used to observe a battlefield during night combats, and to take aim at targets detected by using the night vision goggles. By using such accessories, performance of existing firearms may be significantly improved, and even rifles of an identical type may have different combat power depending on whether accessories are mounted. Accordingly, the accessories may increase a survival rate of combat forces and may improve combat power.

A rail mount has been developed to satisfy the requirements, and is used to mount accessories for guns. The rail mount enables various accessories to be mounted on a rail for mounting accessories, and to be releasably attached thereto.

The rail mount is generally provided on a rail of a gun, and has a lower portion attached to the rail connected to the gun, and an upper portion connected to other accessories, in which the upper portion is formed to receive various accessories.

The most important point for the rail mount is to be firmed attached to the rail under any circumstances. Even when used in a combat situation, the rail mount is required to be rapidly and easily attached and detached, and is required to be firmly attached even when there are fabrication tolerances

SUMMARY OF THE INVENTION

The present disclosure provides a rail mount that may be firmly attached to a rail even when used in an extreme situation such as in case of war, and may be rapidly and easily attached to and detached from the rail.

There is provided a rail mount, having one side releasably attached to a rail of a firearm, such as a rifle and the like, and the other side releasably attached to accessories, the rail mount including: a main body having an upper portion releasably attached to the accessories and a lower portion releasably attached to the rail; a first contact member extending downwards from one side of the lower portion of the main body to contact one side of the rail; a second contact member having a connection end that is hingedly connected to the other side of the lower portion of the main body and a free end that is provided on the opposite side of the connection end and that contacts the other side of the rail; a clamping member having as first end portion that is hingedly connected to the main body at a position where the free end of the second contact member is located and a second end portion that is releasably attached to the main body at a position where the connection end of the second contact member is located; a releasable attachment unit that releasably attaches the clamping member to the main body; and a pressure member that presses the free end of the second contact member toward the rail, so as to enable the free end of the second contact member to firmly contact the rail when the clamping member is attached to the releasable attachment unit, and that is movably connected to the clamping member in a direction closer to or further away from the second contact member.

The pressure member may be connected at a position where the free end of the second contact member is located.

The pressure member may be screw-coupled to the clamping member, and may linearly move by rotation.

The releasable attachment unit may include: a projection member formed on a second end portion of the pressure member; a first member that is movably connected to the main body, and has a contact portion that is a slant surface and is pressed by the projection member when the pressure member rotates toward the main body and has a contact groove that extends from the contact portion, is formed in a direction toward the first end portion, and receives the projection member; and a second member that elastically presses the first member in a direction opposite to the first end portion, in which when the pressure member rotates toward the main body, the first member moves in a direction toward the second end portion of the clamping member while the projection member pushes the contact portion, and when the projection member continues to move to be received in the contact groove, the first member moves, by elasticity of the second member, in a direction opposite to the second contact member, such that movement of the projection member is restricted, and the pressure member is connected to the main body.

The present disclosure provides the rail mount that may be firmly attached to a rail by only applying a force to as clamping member, and may be detached from the rail by applying a slight force to a releasable attachment unit. Further, by moving a pressure member, the rail mount may enable firm contact of the second contact member with the rail even when there are fabrication tolerances.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Hereinafter, an exemplary embodiment of the present disclosure will he described with reference to the accompanying drawings.

Figure 1:
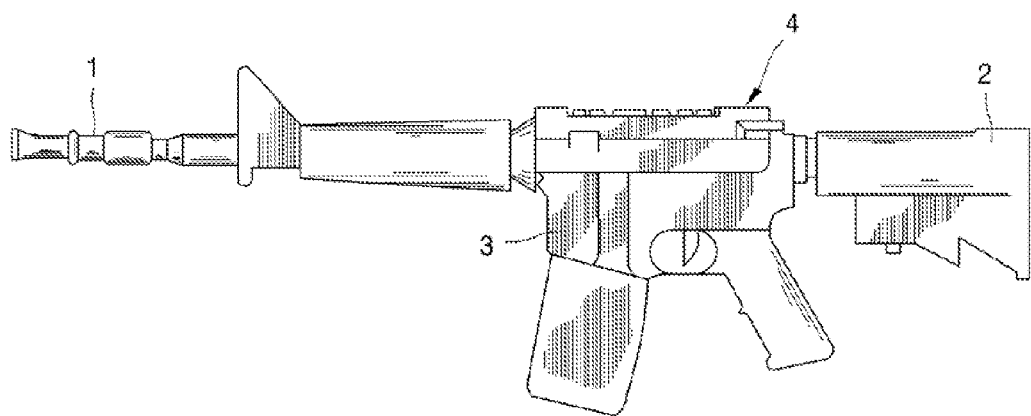
FIG. 1 is a view schematically illustrating a structure of a rifle as a type of firearm.
Figure 2:
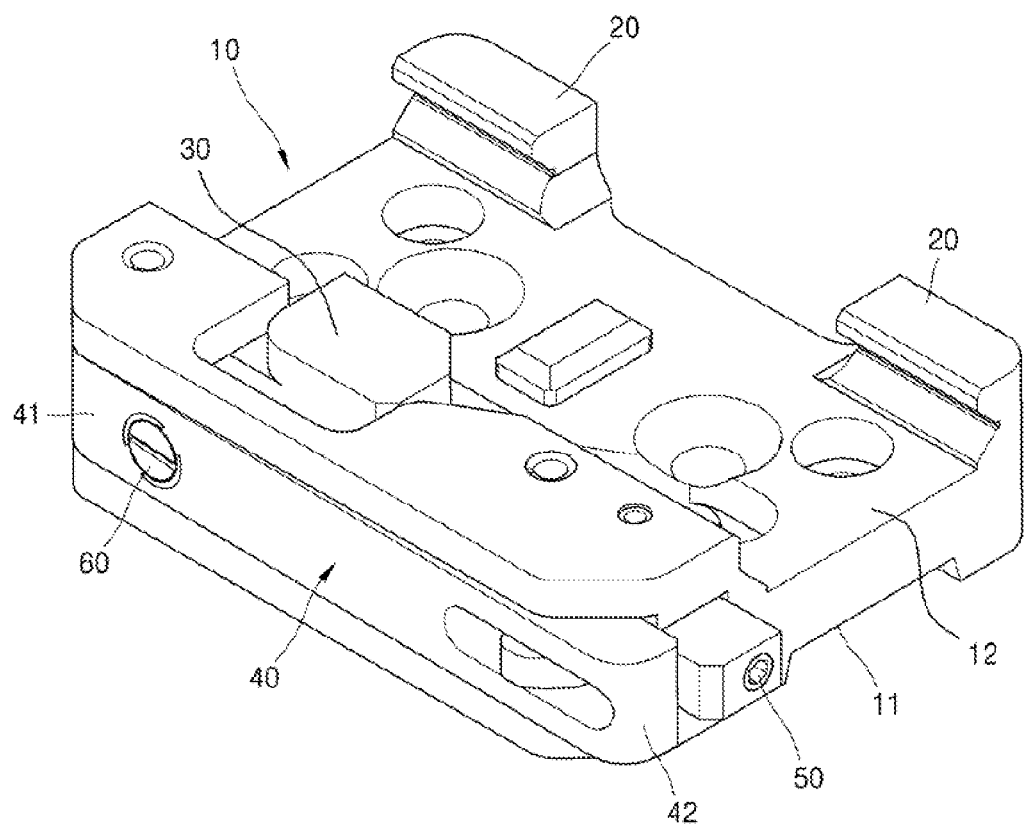
FIG. 2 is a perspective view illustrating a rail mount according to an embodiment.
Figure 3:
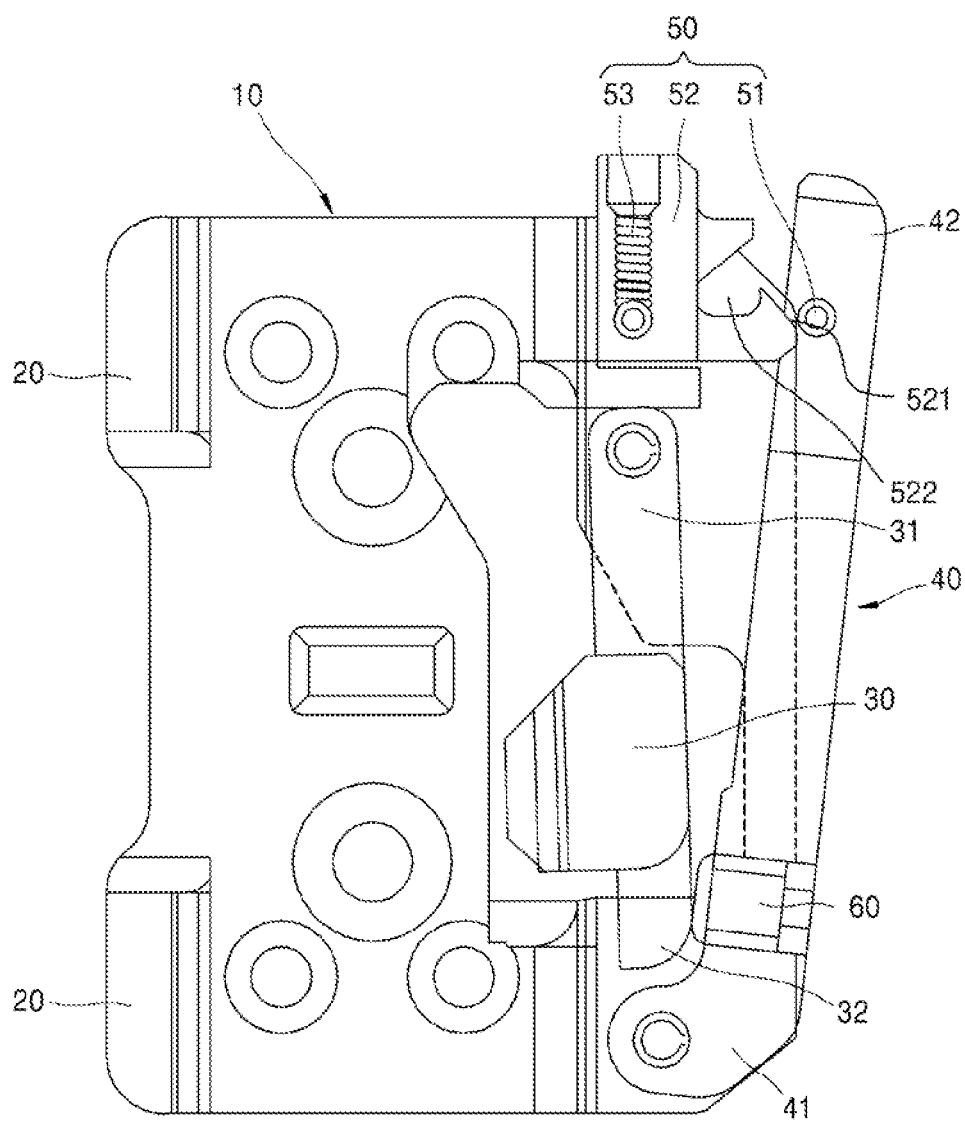
FIGS. 3 to 5 are views illustrating an embodiment of a pressure member pressing a second contact member when a clamping member is attached to a main body.
Figure 4:
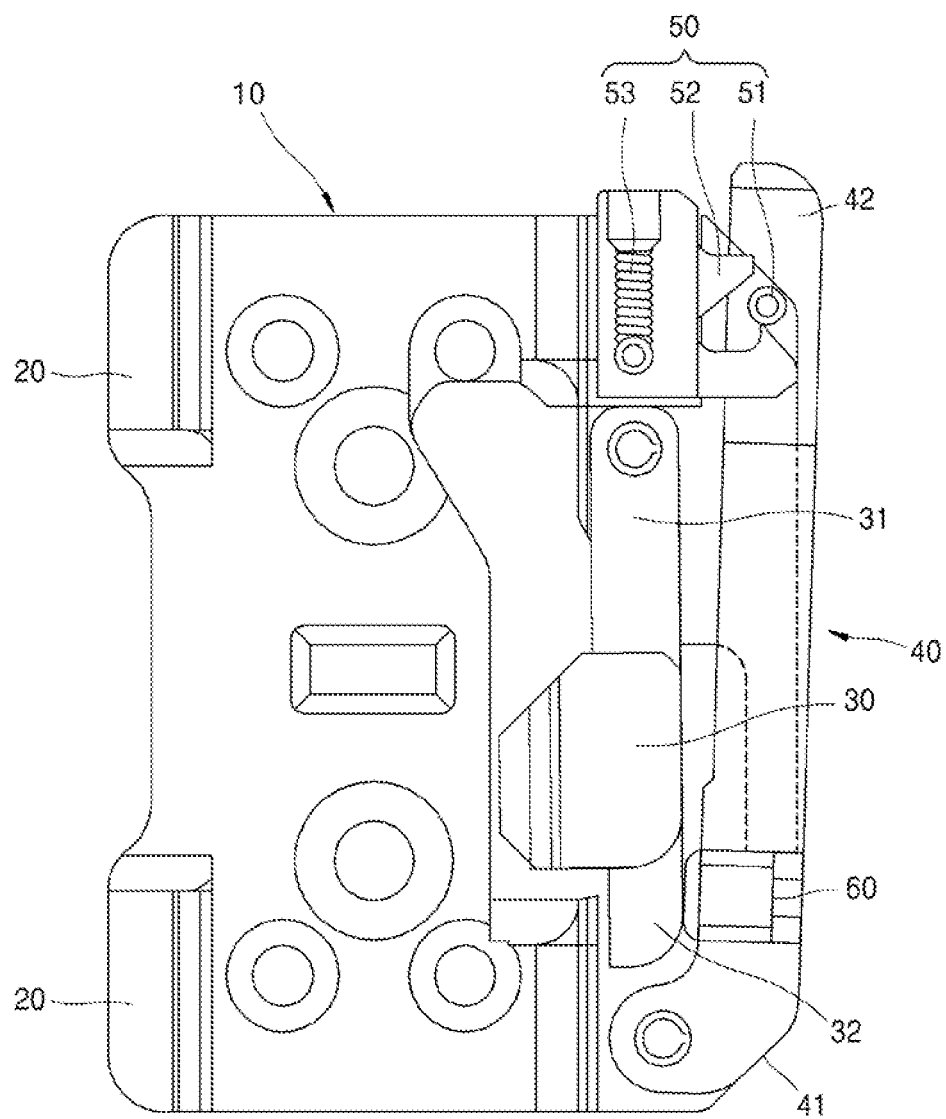
Figure 5:
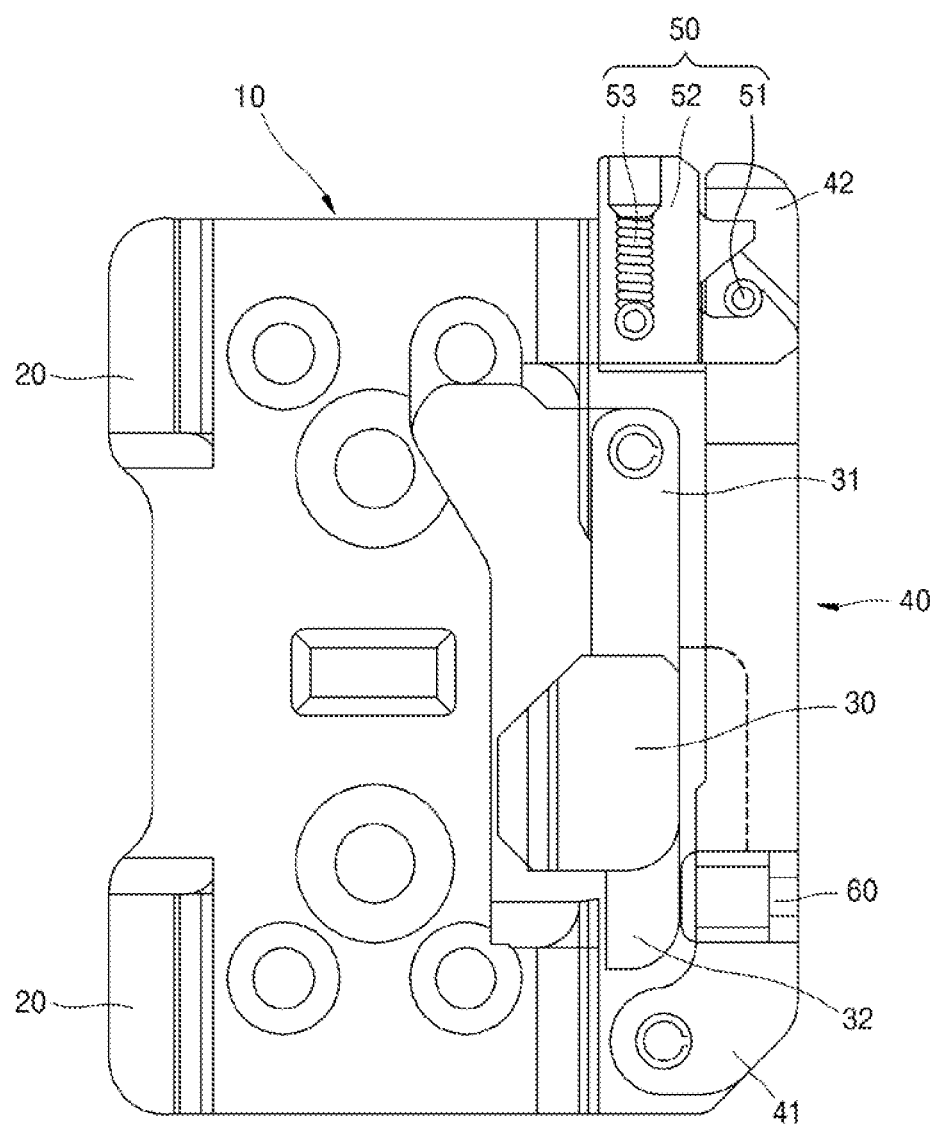

FIG. 1 is a view schematically illustrating a structure of a rifle as a type of firearm. FIG. 2 is a perspective view illustrating a rail mount according to an embodiment. FIGS. 3 to 5 are views illustrating an embodiment of a pressure member pressing a second contact member when a clamping member is attached to a main body.

The present disclosure relates to a rail mount having one side releasably attached to a rail of a firearm and the other side releasably attached to accessories for the firearm. The firearm refers to a gun that is lightweight and having a caliber of 15.24 mm or smaller (the definition given in the Korean dictionary on Naver). FIG. 1 is a schematic view of an M16 rifle, which is a type of firearm and is manufactured by Colt Industries. As illustrated in FIG. 1, the rifle includes a gunpoint 1, a butt plate 2, a magazine pocket 3, a rail 4, and the like, and a rail mount is releasably attached to the rail 4. The rail, to which the rail mount of the present disclosure is connected, may be a rail that is integrally formed with the rifle as illustrated in FIG. 1, or may be a rail that is separately provided and is connected to a rifle to mount a grenade thrower and the like thereon, which is not illustrated in FIG. 1. Examples of accessories that may be connected to the rail mount include a telescopic sight, a unit magnification optical sight, a laser target designator, night vision goggles, an infrared target designator, an infrared illuminator, and the like.

According to the present disclosure, the rail mount includes a main body 10, a first contact member 20, a second contact member 30, a clamping member 40, and a releasable attachment unit 50, and a pressure member 60.

The main body 10 is installed in a firearm, and is composed of an upper portion 11 and a lower portion 12, which refer to the upper portion 11 and the lower portion 12 of the firearm used. The upper portion 11 is releasably attached to the accessories described above, and the lower portion 12 is releasably attached to the rail.

The upper portion 11, which is connected with the accessories, includes grooves, holes (not shown), and the like, so as to be connected with the accessories. The configuration of the upper portion 11 is not a core element of the present disclosure, but is known in the art, and thus, detailed descriptions thereof will be omitted.

As illustrated in FIG. 2, the first contact member 20 is provided on the lower portion 12 of the main body 10, and contacts any one side of the rail. In the exemplary embodiment, there are two separate first contact members 20, but the first contact member 20 may be one with a long shape.

The second contact member 30 is hingedly connected to the lower portion 12 of the main body 10 to enable rotation, and includes a connection end 31 and a free end 32.

The connection end 31 is a portion that is hindedly connected to the main body 10, and the free end 32 is a portion that contacts the other side (a side opposite to the side contacting the first contact member 20) of the rail.

The clamping member 40 is connected to the main body 10, and is formed to have a long shape in a longitudinal direction of the main body 10, in which a first end portion 41 is hingedly connected to the main body 10 at a position where the free end of the second contact member 30 is located, and a second end portion 42 is releasably attached to the main body 10, as illustrated in FIGS. 3 to 5.

The releasable attachment unit 50 enables the clamping member 40 to be releasably attached to the main body 10.

The releasable attachment unit 50 includes a projection member 51, a first member 52, and a second member 53.

The projection member 51 is formed on the second end portion 42 of the clamping member 40, as illustrated in FIG. 3.

The first member 52 is movably connected to the main body 10, and includes a contact portion 521 and a contact groove 522. The contact portion 521 is a slant surface and contacts the projection member 51 when the clamping member 40 rotates toward the main body 10, and the contact groove 522 extends from the contact portion 521, and is formed toward the first end portion 41 of the clamping member 40.

The second member 53, which is a spring, elastically presses the first member 52 in a direction opposite to the first end portion 41 of the clamping member 40.

The pressure member 60 is connected to the clamping member 40 at a position where the free end of the second contact member 30 is located, and presses the free end 32 of the second contact member 30 to enable the free end 32 of the second contact member 30 to firmly contact the rail.

The pressure member 60 is screw-coupled to the clamping member 40 and linearly moves, by rotation, in a direction closer to or further away from the second contact member 30.

In both end portions of the pressure member 60, one end portion opposite to the second contact member 30 has a (−) or (+) shaped groove, to rotate the pressure member 60 by using a screw driver.

Hereinafter, a method of attaching and detaching the main body 10 to and from the rail will be described based on the above description.

FIGS. 3 to 5 are views to explain an example of attaching and detaching the main body to and from the rail.

First, by rotating the clamping member 40 in a direction closer to the main body 10 while contacting the first contact member 20 and the second contact member 30 to both sides of the rail (not shown), the projection member 51 formed on the clamping member 40 contacts the contact portion 521 of the first member 52, as illustrated in FIG. 3.

Then, by further applying a force to the clamping member 40, the force applied to the projection member 51 is transferred to the first member 52, thereby moving the first member 52 toward the first end portion 41 of the clamping member 40, as illustrated in FIG. 4. In this case, the second member 53 is elastically deformed by the movement of the first member 52.

Subsequently, by further rotating the clamping member 40 toward the main body 10, the projection member 51 is received in a contact groove 522 as illustrated in FIG. 5. Once the projection member 51 is received in the contact groove 522, the second member 53 is elastically restored, such that the first member 52 is moved toward the opposite side of the first end portion 41 of the clamping member 40, thereby completing connection. In this case, the clamping member 40 may no longer rotate without an external force applying thereto.

Once the clamping member 40 rotates toward the main body 10, the pressure member 60 also moves toward the second contact member 30 along with the clamping member 40, and while pressing the second contact member 30 by the movement, the rail is connected with the main body 10.

In the case where there is a space between the second contact member 30 and the rail due to fabrication tolerances and the like, or in the case where an end portion where the pressure member 60 and the second contact member 30 contact with each other is worn out after being used repetitively, the second contact member 30 and the rail may firmly contact with each other by appropriately rotating the pressure member 60 to move the pressure member 60 toward the second contact member 30. The pressure member 60 is disposed at a position where the free end 32 of the second contact member 30 is located, as illustrated in FIGS. 3 to 5. In other words, the pressure member 60 is disposed at a position where the first end portion 41 of the clamping member 40 is located, thereby producing an effect in that a force, greater than a force applied to the second end portion 42 of the clamping member 40, may be applied to the second contact member 30.

The main body 10 may be detached from the rail in such a manner that a pressure is applied to the first member 52 such that the first member 52 is moved toward the first end portion 41 of the clamping member 40 while elastically deforming the second member 53, and then, by rotating the clamping member 40 in a direction further away from the main body 10, connection of the clamping member 40 with the releasable attachment unit 50 is released. In this manner, the main body 10 may be detached from the rail.

Although the present disclosure has been described with reference to an embodiment thereof, it should be understood that the present disclosure is not limited thereto, and numerous other modifications and embodiments of various types of rail mount can be devised by those skilled in the art that will fall within the spirit and scope of the principles of this disclosure.

What is claimed is:

1. A rail mount, having one side releasably attached to a rail of a firearm and the other side releasably attached to accessories, the rail mount comprising:

a main body having an upper portion releasably attached to the accessories and a lower portion releasably attached to the rail;

a first contact member extending downwards from one side of the lower portion of the main body to contact one side of the rail;

a second contact member having a connection end that is hingedly connected to the other side of the lower portion of the main body and a free end that is provided at a position opposite to the connection end and that contacts the other side of the rail;

a clamping member having a first end portion that is hingedly connected to the main body at a position where the free end of the second contact member is located and a second end portion that is releasably attached to the main body at a position where the connection end of the second contact member is located;

a releasable attachment unit that releasably attaches the clamping member to the main body; and a pressure member that presses the free end of the second contact member toward the rail, so as to enable the free end of the second contact member to firmly contact the rail when the clamping member is attached to the releasable attachment unit, and that is movably connected to the clamping member in a direction closer to or further away from the second contact member.

2. The rail mount of claim 1, wherein the pressure member is connected at a position where the free end of the second contact member is located.

3. The rail mount of claim 1, wherein the pressure member is screw-coupled to the clamping member, and linearly moves by rotation.

4. The rail mount of claim 1, wherein the releasable attachment unit comprises:

a projection member formed on the second end portion of the clamping member;

a first member that is movably connected to the main body, and has a contact portion that is a slant surface and is pressed by the projection member when the clamping member rotates toward the main body and has a contact groove that extends from the contact portion, is formed in a direction toward the first end portion, and receives the projection member; and a second member that elastically presses the first member in a direction opposite to the first end portion, wherein when the clamping member rotates toward the main body, the first member moves in a direction toward the first end portion of the clamping member while the projection member pushes the contact portion, and when the projection member continues to move to be received in the contact groove, the first member moves, by elasticity of the second member, in a direction opposite to the second contact member, such that movement of the projection member is restricted, and the clamping member is connected to the main body.

* * * * *